(12) United States Patent
Lehtinen et al.

(10) Patent No.: US 10,618,777 B2
(45) Date of Patent: *Apr. 14, 2020

(54) ROPE LIFTING TOOL AND A ROPE LIFTING ARRANGEMENT

(71) Applicant: KONE Corporation, Helsinki (FI)

(72) Inventors: Hannu Lehtinen, Numminen (FI); Teemu Majasalmi, Läyliäinen (FI)

(73) Assignee: KONE CORPORATION, Helsinki (FI)

( * ) Notice: Subject to any disclaimer, the term of this patent is extended or adjusted under 35 U.S.C. 154(b) by 480 days.

This patent is subject to a terminal disclaimer.

(21) Appl. No.: 15/270,867

(22) Filed: Sep. 20, 2016

(65) Prior Publication Data

US 2017/0107079 A1 Apr. 20, 2017

(30) Foreign Application Priority Data

Oct. 20, 2015 (EP) .................................... 15190602

(51) Int. Cl.
*B66B 7/08* (2006.01)
*B66B 19/02* (2006.01)
*F16G 11/04* (2006.01)

(52) U.S. Cl.
CPC .............. *B66B 7/085* (2013.01); *B66B 19/02* (2013.01); *F16G 11/04* (2013.01)

(58) Field of Classification Search
CPC ......... B66B 19/02; B66B 7/062; B66B 7/085; B66B 15/02; F16G 11/04
See application file for complete search history.

(56) References Cited

U.S. PATENT DOCUMENTS

| | | | | |
|---|---|---|---|---|
| 4,643,276 A | * | 2/1987 | Philobos ................. | B66B 5/022 187/278 |
| 5,353,893 A | * | 10/1994 | Sun ......................... | B66B 7/068 187/412 |

(Continued)

FOREIGN PATENT DOCUMENTS

| | | | | |
|---|---|---|---|---|
| CA | 2804544 A1 | * | 1/2012 | ............. B66B 19/02 |
| WO | WO 2010/000330 A1 | | 1/2010 | |
| WO | WO 2014/118315 A1 | | 8/2014 | |

*Primary Examiner* — Diem M Tran
(74) *Attorney, Agent, or Firm* — Birch, Stewart, Kolasch & Birch, LLP

(57) ABSTRACT

A rope lifting tool for belt-shaped ropes provided with an uneven surface pattern on one or both of its opposing wide sides, includes a first guide for guiding the rope lifting tool along a first guide rail; a second guide for guiding the rope lifting tool along a second guide rail; an upright plate, and an inclined plate at an acute angle relative to the upright plate, the upright plate and the inclined plate having a wedge shaped space between them; and a plurality of wedge members placed adjacent each other inside the wedge-shaped space. A rope gap for receiving an end of a belt-shaped rope is formed between each wedge member and the upright plate, which rope gap is narrowable by wedging of the wedge member in the wedge shaped space. A rope lifting arrangement includes the rope lifting tool. Each rope gap is delimited by a vertical face of a wedge member and a vertical face of the upright plate or a vertical face of a liner attached thereon, and the vertical face of the wedge member and/or the vertical face of the liner is provided with an uneven surface pattern forming a counterpart for the uneven surface pattern of the belt-shaped rope.

20 Claims, 4 Drawing Sheets

(56) References Cited

U.S. PATENT DOCUMENTS

| | | | |
|---|---|---|---|
| 9,422,134 B2 * | 8/2016 | Ikonen | B66B 5/0031 |
| 10,029,889 B2 * | 7/2018 | Alasentie | B66B 7/062 |
| 2010/0178150 A1 * | 7/2010 | Fargo | B66B 7/085 |
| | | | 414/800 |
| 2013/0111723 A1 * | 5/2013 | Forsstrom | B66B 19/02 |
| | | | 29/401.1 |
| 2015/0368068 A1 | 12/2015 | Widmer | |

* cited by examiner

ROPE LIFTING TOOL AND A ROPE LIFTING ARRANGEMENT

FIELD OF THE INVENTION

The invention relates to lifting of ropes of an elevator in context of their installation.

BACKGROUND OF THE INVENTION

Elevators typically utilize several ropes connected to the car, such as suspension ropes arranged to suspend the car. These ropes are typically arranged to interconnect the car with a counterweight and to pass around one or more rope wheels mounted above the car and counterweight, typically in the upper end of the hoistway or in its proximity. When the elevator is being manufactured or when old ropes of an existing elevator need to be changed, new ropes are installed. During installation, the ropes are unreeled and guided to hang in the hoistway. The ropes can be unreeled from rope reels and guided further to pass their intended route in the hoistway, such as around the rope wheels mounted in the upper end of the hoistway or in its proximity. The guiding can be done by lowering the ropes from their reels positioned close to the upper end of the hoistway. Alternatively, the guiding can be done by lifting the ropes inside the hoistway from their reels positioned close to the upper end of the hoistway. In prior art, it has been possible to install metal wire ropes that have a round cross-section simply by unreeling them from reels positioned close to the lower end of the hoistway, and lifted up with a hoisting device engaging their ends. This is because this kind of ropes can be engaged firmly without damaging them with permanent deformations. The drawback of the known installation methods and devices has been that they have not enabled installation of several belt-like ropes by lifting with simple devices, and without damaging the internal structures or the surface structures of the ropes. This is particularly relevant with ropes, which comprise internal elements that are fragile or rigid such that they should not be sharply bent and/or a surface structure, such as an uneven surface pattern, that could be easily deformed under compression.

BRIEF DESCRIPTION OF THE INVENTION

The object of the invention is to provide a solution alleviating problems occurring in lifting of elevator ropes during installation thereof. An object is to alleviate one or more of the above defined problems of prior art and/or problems discussed or implied elsewhere in the description. An object is particularly to provide an improved rope lifting tool, which is suitable for belt-shaped ropes, as well as an improved arrangement for lifting such belt-shaped ropes. An object is furthermore to introduce a solution enabling engagement to several belt-shaped ropes reliably without damaging their internal structures or their surface structures, as well as efficient and well controlled lifting of the ropes inside the hoistway of an elevator under modification or construction. It is brought forward such embodiments, inter alia, which can be used with ropes that are fragile or rigid such that they should not be sharply bent and/or have an uneven surface pattern susceptible to deformation under compression. It is also brought forward such embodiments, inter alia, which are easy to use.

It is brought forward a new rope lifting tool for belt-shaped ropes. Said ropes can be ropes provided with an uneven surface pattern on one or both of its opposing wide sides. The rope lifting tool comprises a first guide for guiding the rope lifting tool along a first guide rail; a second guide for guiding the rope lifting tool along a second guide rail; an upright plate and an inclined plate at an acute angle relative to the upright plate. The upright plate and the inclined plate have a wedge shaped space between them, and the rope lifting tool further comprises a plurality of wedge members placed adjacent each other inside the wedge-shaped space, such that a rope gap for receiving an end of a belt-shaped rope is formed between each wedge member and the upright plate, which rope gap is narrowable by wedging of the wedge member in the wedge shaped space. With this construction one or more of the above mentioned objectives can be achieved. Particularly, several belt-shaped ropes can thus be lifted by clamping them gently yet firmly. The tool is simple to manufacture as well as use.

According to the invention, each said rope gap is delimited by a vertical face of a wedge member and a vertical face of the upright plate or a vertical face of a liner attached thereon. The gap is thereby delimited by two opposing vertical faces.

In a preferred embodiment, one or both of the vertical faces delimiting the rope gap is provided with an uneven surface pattern for forming a counterpart for the uneven surface pattern of said belt-shaped rope. Thus, the rope provided with an uneven surface pattern on one or both of its opposing wide sides can be engaged without damaging its surface structures. Preferably, one or both of said vertical face of said wedge member and said vertical face of the liner are provided with an uneven surface pattern for forming a counterpart for the uneven surface pattern of said belt-shaped rope. Hereby, the lifting tool can be simply provided with several adjacent uneven patterns for several ropes. It is particularly possible to provide an uneven counterpart face for each uneven face of a rope without the need to machine the upright plate. With the liner, machining of the upright plate can be avoided particularly in cases where the wide side facing the upright plate is uneven.

In a preferred embodiment, the wedge shaped space as well as the wedge members are downwardly tapered and each wedge member is placed in the space such that it has opposite each other a front side face for contacting a rope as well as a back side face, which back side face faces the inclined plate and is parallel with the inclined plate. The front side face faces the upright plate and is parallel with it.

In a preferred embodiment, said surface pattern is a polyvee pattern. Thereby, the vertical face provided with an uneven surface pattern comprises plurality of elongated ribs and plurality of elongated grooves. Thereby, the pattern is suitable to form a counterpart a polyvee pattern of said belt-shaped rope and gently engage to it without causing deformations. Said surface pattern being a polyvee pattern, each wide side of the rope provided with an uneven surface pattern likewise comprises plurality of elongated ribs and plurality of elongated grooves oriented in the longitudinal direction of the rope.

In a preferred embodiment, said vertical faces delimiting the rope gap are straight in vertical direction when the rope lifting tool is in upright position. Thereby rope clamped by them will not be bent into a curved form.

In a preferred embodiment, said vertical faces delimiting the rope gap are planar. Thereby, these faces are straight in vertical direction when the rope lifting tool is in upright position. This is advantageous because thus the rope clamped by them will not be bent into a curved form, as well as because the lifting tool is thus simple to manufacture.

In a preferred embodiment, the rope lifting tool comprises one or more liners attached on the upright plate. Each said liner can be a liner plate. Preferably, the rope lifting tool comprises a plurality of liner plates attached on the upright plate, preferably one opposite the vertical face of each wedge member. Thus, a separate liner can be provided for each rope. Thus, several adjacent patterns need not be machined on one larger element, which would be laborious. This also adds flexibility in the manufacturing process, in particular because thus the relative position of the patterns can be determined by placing the liner plates at a desired distance from each other.

In a preferred embodiment, each liner plate has a planar backface placed to rest directly against a vertical planar face of the upright plate.

In a preferred embodiment, said vertical faces delimiting the rope gap are parallel.

In a preferred embodiment, said guides are arranged to position the rope lifting tool in an upright position when the rope lifting tool is mounted to take support from vertical guide rails. The upright plate is aligned to extend along a vertical plane when the rope lifting tool is in its upright position. The vertical attitude of the plate contributes for supporting the rope end such that it extends in vertical direction without bending it in any way.

In a preferred embodiment, the rope gap for receiving an end of a belt-shaped rope is substantially larger in width direction of the rope lifting tool than in thickness direction of the rope lifting tool.

In a preferred embodiment, the rope gap for receiving an end of a belt-shaped rope is at least substantially rectangular.

In a preferred embodiment, the wedge members are movable separately from each other in the wedge shaped space.

In a preferred embodiment, the inclined plate is mounted on the upright plate.

In a preferred embodiment, the guides are mounted on the upright plate.

In a preferred embodiment, the upright plate comprises a suspending means for suspending the rope lifting tool, such as an aperture for receiving a lifting hook.

In a preferred embodiment, the wedge members are movable in the wedge shaped space in first direction (downwards) such that the rope gap is narrowed and in second direction (upwards) such that the rope gap is widened.

In a preferred embodiment, the wedge shaped space is downwardly tapered and the wedge members are movable in the wedge shaped space between a lower position and an upper position, whereby the rope gap is narrower when the wedge members are in the lower position than in the upper position, and the rope lifting tool comprises a holding means for holding the wedge members in said upper position. Thereby, the holding means can hold the wedge member in a position where the gap is wide, thus enabling easy installation of the rope in the gap. Preferably, the rope lifting tool comprises separate holding means for each of the wedge members, the wedge members thereby being separately holdable in the upper position. Preferably, said holding means comprises a releasable plunger having a head movable into and out from a recess formed in the wedge member. The plunger is preferably be spring loaded.

In a preferred embodiment, each wedge member has a handle for manual movement thereof inside the space. The handle is preferably on top of the wedge member. The handle preferably comprises an eye through which a finger can be inserted.

In a preferred embodiment, the first guide and the second guide are on opposite sides of the upright plate in width direction of the rope lifting tool.

In a preferred embodiment, the rope lifting tool comprises a fixing means for fixing the upright plate and the inclined plate immovably relative to each other. The fixing means are preferably releasable for enabling detachment of the plates from each other. Preferably, the rope lifting tool comprises an intermediate member placed between said plates to position these relative to each other.

In a preferred embodiment, the rope lifting tool comprises a limit means for limiting the vertical range of movement of the wedge members. Thereby the wedge members cannot fall down in the hoistway. The limit means may comprise a guide bolt fixed on each wedge member and an elongated aperture provided on the inclined plate for each bolt through which the guide bolt extends.

In a preferred embodiment, the rope lifting tool comprises a limit member between wedge members next to each other for limiting the range of movement of them in width direction of the rope lifting tool.

In a preferred embodiment, the upright plate and/or the inclined plate is a plate of uniform material thickness. The material of said plates is preferably metal.

It is also brought forward a new rope lifting arrangement comprising a rope lifting tool as described somewhere above and/or elsewhere in the application. The rope lifting arrangement comprises a plurality of ropes, each having an end placed in a rope gap of said rope lifting tool and clamped immovably therein by wedging of a wedge member. Each of said ropes is preferably provided with an uneven surface pattern on one or both of its opposing wide sides.

In a preferred embodiment, each rope is provided with an uneven surface pattern on a wide side placed to rest against a vertical face of a liner attached on the vertical face of the upright plate, which vertical face of the liner is provided with an uneven surface pattern forming a counterpart for the uneven surface pattern of said wide side.

In a preferred embodiment, each rope is provided with an uneven surface pattern on a wide side placed to rest against a vertical face of a wedge member, which vertical face of said wedge member is provided with an uneven surface pattern forming a counterpart for the uneven surface pattern of said wide side.

In a preferred embodiment, one wide side of the opposing wide sides of the rope is smooth (i.e. devoid of an uneven surface pattern, such as ribs and grooves) and one wide side of the rope is provided with said uneven surface pattern. Preferably, the smooth wide side is placed to rest against the vertical face of the upright plate and the wide side provided with said uneven surface pattern is placed to rest against the vertical face of said wedge member, which vertical face of said wedge member is provided with an uneven surface pattern forming a counterpart for the uneven surface pattern of said wide side.

In a preferred embodiment, the arrangement is an arrangement for installing said ropes.

In a preferred embodiment, the arrangement further comprises one or more rope reels storing said ropes wherefrom the ropes are unreeled while the rope ends are immovably wedged and lifted by the rope lifting tool.

In a preferred embodiment, the arrangement further comprises a hoist arranged to lift the lifting tool.

In a preferred embodiment, the ropes are ropes of an elevator.

In a preferred embodiment, the a rope lifting tool is installed in a hoistway of an elevator, the first guide being arranged to lean against a first guide rail mounted in the hoistway, and the second guide to lean against a second guide rail mounted in the hoistway.

In a preferred embodiment, the upright plate is aligned to extend along a vertical plane.

In a preferred embodiment, said plurality of wedge members includes at least six wedge members.

In a preferred embodiment, the end of each rope is clamped immovably in the gap without bending it such that it extends in vertical direction.

Preferably, said rope comprises one or more load bearing members, which are embedded in a polymer coating forming the surface of the rope, the load bearing members extending parallel to the longitudinal direction of the rope unbroken throughout the length of the rope.

Preferably, the width/thickness ratio of the rope is more than two, preferably more than 4. Thereby, the rope attitude in the gap is easily controllable and the pressure exerted thereon is distributed on vast area. Thereby, the rope is also belt well suitable for elevators e.g. due to controllability of its attitude during its passing along diverting wheels. Preferably, said one or more load bearing members is/are made of composite material comprising reinforcing fibers in polymer matrix, said reinforcing fibers preferably being carbon fibers. Composite material of this kind is typically fragile and rigid in all directions. The rope lifting tool as presented is gentle and does not require bending of the rope end, whereby it can clamp effectively this kind of ropes.

Preferably, the reinforcing fibers of each load bearing member are substantially evenly distributed in the polymer matrix of the load bearing member in question.

Preferably, said guides are sliding members elongated in the direction of the guide rail.

In a preferred embodiment, said plurality of wedge members includes at least six wedge members and said plurality of ropes includes at least six ropes. With the rope lifting tool a great number of ropes can be lifted. Particularly, this is feasible when the ropes are of light-weighted structure such as comprising load bearing members comprising said composite material.

The aforementioned elevator is preferably an elevator for transporting passengers and/or goods. For this purpose, the elevator is provided with or is to be provided with a car that has an interior space suitable for receiving a passenger or passengers and/or load to be lifted. The elevator is preferably then such that the car thereof is arranged to serve two or more landings. The elevator preferably controls movement of the car in response to calls from landing and/or destination commands from inside the car so as to serve persons on the landing(s) and/or inside the elevator car.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
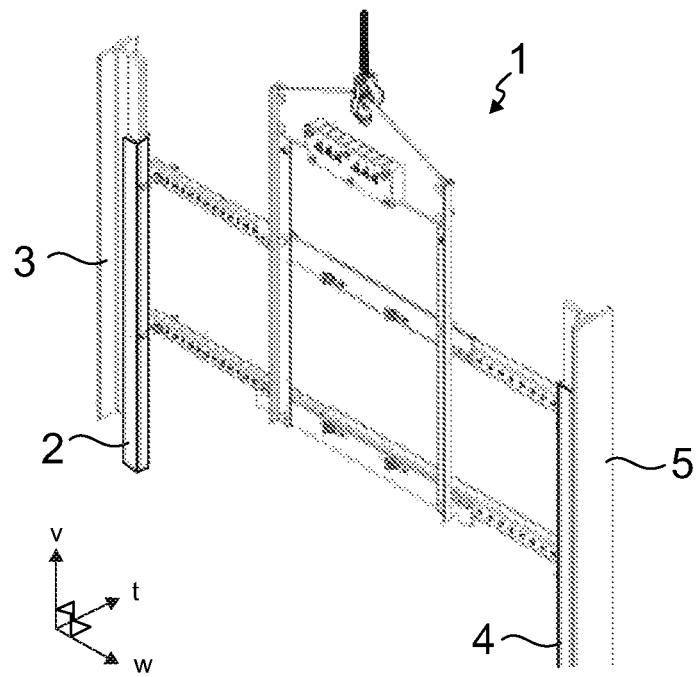
FIG. 1 illustrates a rope lifting tool in upright position.
Figure 2:
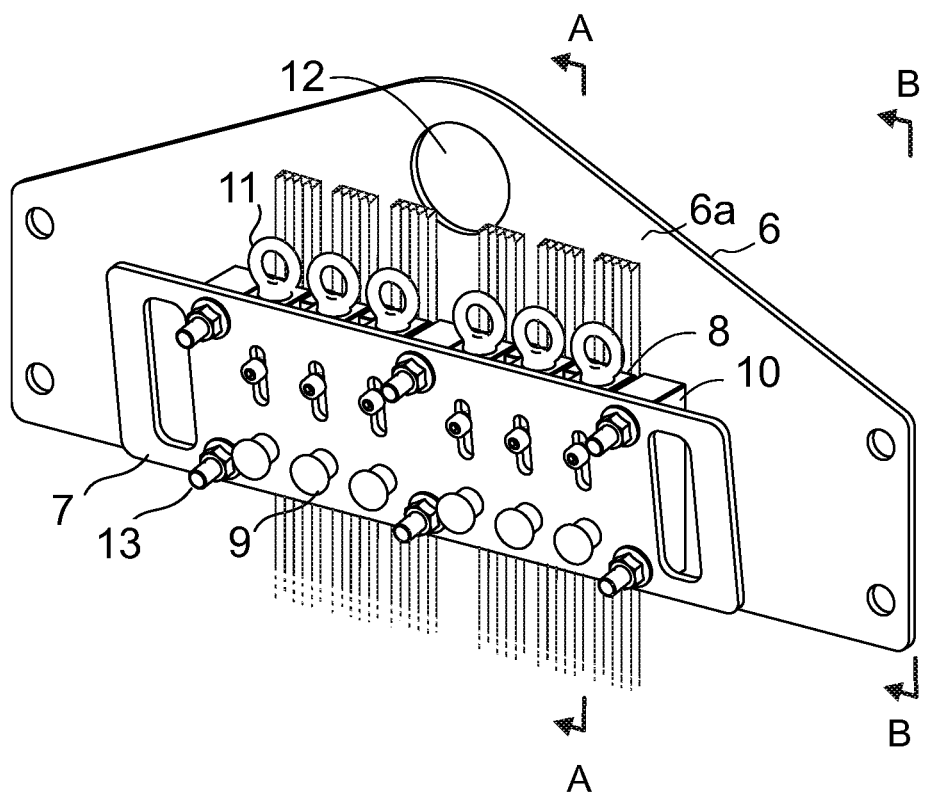
FIG. 2 illustrates partially the rope lifting tool of FIG. 1 when ropes have been installed therein.
Figure 3A:
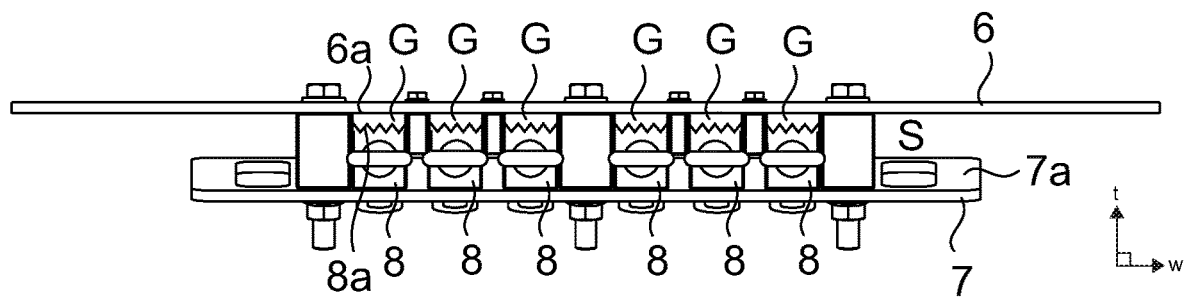
FIG. 3a illustrates the rope lifting tool in accordance with a first preferred embodiment as viewed from above.
Figure 3B:
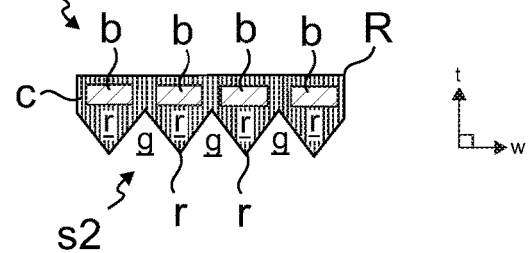
FIG. 3b illustrates a rope of a first kind to be lifted.
Figure 3C:
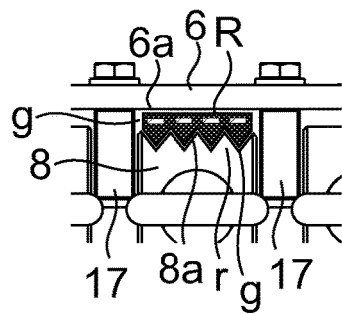
FIG. 3c illustrates an enlarged part of FIG. 3a together with the rope of FIG. 3b.
Figure 4A:
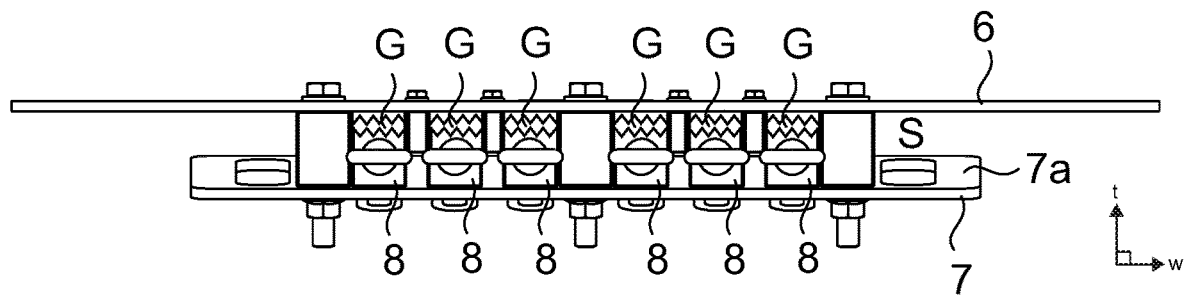
FIG. 4a illustrates the rope lifting tool in accordance with a second preferred embodiment as viewed from above.
Figure 4B:
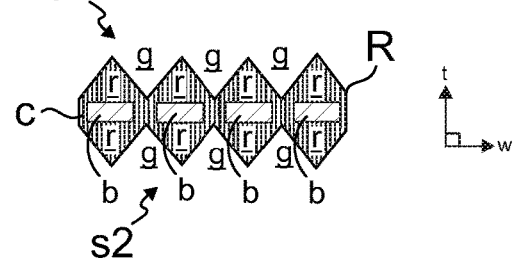
FIG. 4b illustrates a rope of a first kind to be lifted.
Figure 4C:
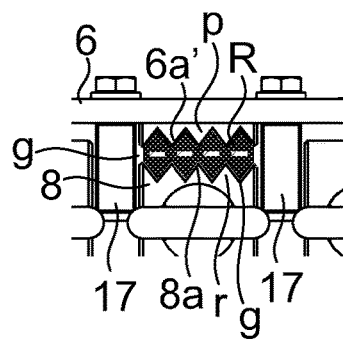
FIG. 4c illustrates an enlarged part of FIG. 4a together with the rope of FIG. 4b.

FIG. 1 illustrates an embodiment of a rope lifting tool 1 for belt-shaped ropes mounted to take lateral support from vertical guide rails 3, 5 mounted immovably in a hoistway of an elevator. FIG. 2 discloses the rope lifting tool of FIG. 1 when ropes have been installed therein. FIGS. 3a-3c disclose further details of the rope lifting tool 1 in accordance with a first preferred embodiment utilized with a rope R having an uneven surface pattern on only one of its opposing wide sides. The wide side is a side of the rope R facing in thickness direction of the rope R. FIGS. 4a-4c disclose further details of the rope lifting tool 1 in accordance a second preferred embodiment utilized with a rope R having an uneven surface pattern on both of its opposing wide sides. The rope lifting tool 1 comprises a first guide 2 for guiding the rope lifting tool 1 along a first guide rail 3 and a second guide 4 for guiding the rope lifting tool 1 along a second guide rail 5. The rope lifting tool 1 further comprises an upright plate 6, as well as an inclined plate 7, which is apart from the upright plate 6 and at an acute angle relative to the upright plate 6. The inclined plate 7 is mounted on the upright plate 6. The upright plate 6 and the inclined plate 7 are positioned such that they have a wedge shaped space S between them. Said guides 2,4 are arranged to position the rope lifting tool 1 in upright position when the rope lifting tool 1 is mounted to take lateral support from vertical guide rails 3,5 by said guides 2,4. When the rope lifting tool 1 is in its upright position, as illustrated, the upright plate 6 is aligned to extend along a vertical plane. The rope lifting tool 1 being provided with said guides 2,4, the correct attitude thereof can be ensured during movement of the tool 1. For example, tilting of the tool 1 can be avoided. Due to the upright plate 6 being vertical, it extends parallel with the ropes R to be lifted with the lifting tool 1 which ropes R hang vertically from the rope lifting tool 1 when being lifted. The vertical attitude of the plate 6 contributes for supporting the rope end such that it extends in vertical direction v without bending it in any way. As a result, the rope lifting tool 1 is well suitable also for lifting ropes that cannot be bent sharply. The upright plate 6 has a vertical planar face 6a forming the face against which the ropes R are to be supported directly or via a liner p attached on the vertical planar face 6a. The rope lifting tool 1 further comprises a plurality of wedge shaped members 8 (later referred to as wedge members) placed inside the wedge-shaped space S adjacent each other in width direction of the rope lifting tool 1. Accordingly, the same wedge-shaped space S is utilized for accommodating several adjacent wedge members 8. A rope gap G for receiving an end of a belt-shaped rope R is formed between each wedge member 8 and the upright plate 6, which rope gap G is narrowable by wedging of the wedge member 8 in the wedge shaped space S so that the rope R installed in the gap G is clamped. Thereby, in each rope gap G a rope R can be installed and clamped between the wedge member 8 and the upright plate

6. When in the rope gap G, the one of the two wide opposite sides thereof faces towards the upright plate 6 and the other towards the wedge member 8.

The wedge members 8 are separate members and movable separately from each other in the wedge shaped space S. Thereby, ropes R can be clamped and subsequently released independently of each other.

Each said rope gap G is delimited by two opposing faces. One of these opposing faces is the vertical face 8a of a wedge member 8. The other one of these two opposing faces is the vertical face of the upright plate 6 itself or alternatively of a liner p attached thereon. These two alternatives have been illustrated in FIGS. 3a-3c and FIGS. 4a-4c, respectively. When the rope lifting tool 1 is intended for belt-shaped ropes R provided with an uneven surface pattern on only one of its opposing wide sides S1,S2, one of the opposing vertical faces delimiting the gap G is provided with an uneven surface pattern forming a counterpart for the uneven surface pattern of said belt-shaped rope R. Correspondingly, when the rope lifting tool 1 is intended for belt-shaped ropes R provided with an uneven surface pattern on both of its opposing wide sides S1,S2, both of the vertical faces delimiting the gap G are provided with an uneven surface pattern forming a counterpart for the uneven surface pattern of said belt-shaped rope R.

FIG. 3a illustrates features of a first embodiment according to the invention particularly to be utilized with a rope R having an uneven surface pattern on only one of its opposing wide sides S1,S2. In this embodiment, each said rope gap G is delimited by a vertical face 8a of a wedge member 8 and a vertical face 6a of the upright plate 6. The wide side S2 provided with said uneven surface pattern is placed to rest against the vertical face 8a of said wedge member 8. The opposite wide side S1 of the rope R is smooth (i.e. devoid of an uneven surface pattern, such as ribs and grooves), and placed to rest directly against the vertical face 6a of the upright plate 6. Said vertical face 8a is provided with an uneven surface pattern forming a counterpart for the uneven surface pattern of said belt-shaped rope R. Said vertical faces 6a and 8a are contact faces for contacting the ropes R. As illustrated in FIG. 3c, each rope R is in this embodiment supported directly against the vertical face 6a of the upright plate 6. Accordingly, no liner plate need to be used. In the embodiment presented, said uneven surface pattern is a polyvee pattern. Thereby, the vertical face 8a provided with the uneven surface pattern comprises elongated ribs r as well as plurality of elongated grooves g between said ribs r, which ribs r and grooves g are all oriented in vertical direction when the rope lifting tool 1 is in upright position. The uneven surface pattern being a polyvee pattern, the wide side of the belt-shaped rope R provided with an uneven surface pattern likewise comprises plurality of elongated ribs r and plurality of elongated grooves g, which are oriented parallel with the longitudinal direction of the rope R.

FIG. 4a illustrates a second embodiment according to the invention particularly to be utilized with a rope having an uneven surface pattern on both of its opposing wide sides S1,S2. In this embodiment, each said rope gap G is delimited by a vertical face 8a of a wedge member 8 and a vertical face 6a' of a liner p attached on the vertical face 6a of the upright plate 6. The vertical face 6a' of a liner p is parallel with face 6a of the upright plate 6. One (side S1) of the two wide sides S1,S2 that is provided with an uneven surface pattern is placed to rest against the vertical face 6a' of the liner p attached on the vertical face 6a of the upright plate 6, and the other (side S2) of the two wide sides S1,S2 that is provided with an uneven surface pattern is placed to rest against the vertical face 8a of said wedge member 8. Said vertical face 8a of said wedge member 8 and said vertical face 6a' of the liner p are both provided with an uneven surface pattern forming a counterpart for the uneven surface pattern of said belt-shaped rope R. Said vertical faces 6a' and 8a are contact faces for contacting the ropes R. In the embodiment presented, said uneven surface pattern is a polyvee pattern. Thereby, the vertical faces 8a,6a' provided with the uneven surface pattern comprises elongated ribs r as well as plurality of elongated grooves g between said ribs r, which ribs r and grooves g are all oriented in vertical direction when the rope lifting tool 1 is in upright position. The uneven surface pattern being a polyvee pattern, the wide sides S1,S2 of the belt-shaped rope R provided with an uneven surface pattern likewise comprise plurality of elongated ribs r and plurality of elongated grooves g, which are oriented parallel with the longitudinal direction of the rope R. In this embodiment, each rope R is supported by the vertical face 6a of the upright plate 6 via a liner p attached thereon. Said liner p is preferably in the form of a liner plate. Preferably, the rope lifting tool 1 comprises a plurality of liner plates p attached on the upright plate 6 opposite the wedge members 8. Preferably, each said liner plate has a planar backface placed to rest directly against a vertical planar face 6a of the upright plate 6, as illustrated.

Figure 5:
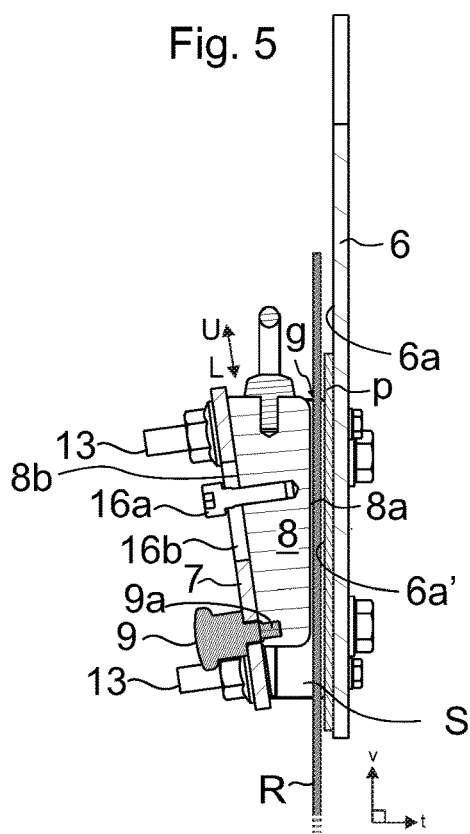
FIG. 5 illustrates a cross-section A-A of FIG. 2.
Figure 6:
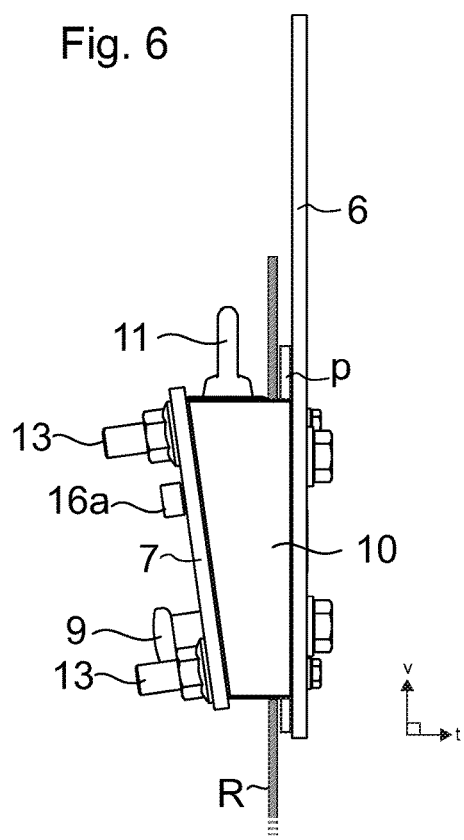
FIG. 6 illustrates a cross-section B-B of FIG. 2.

FIGS. 5 and 6 illustrate cross sections of FIG. 2. In FIG. 5 the liner p of the embodiment of FIGS. 4a-4c is visible. With the embodiment of FIGS. 3a-3c the cross section A-A is otherwise similar but with the difference that the liner p is omitted.

In the presented embodiments, said rope R comprises load bearing members b, which are embedded in a polymer coating c forming the surface of the rope R, the load bearing members b extending parallel to the longitudinal direction of the rope unbroken throughout the length of the rope R. The coating c is preferably made of elastomer, most preferably of polyurethane or rubber.

The narrowing of the gap G is provided for in the presented embodiments such that the wedge shaped space S as well as the wedge members 8 are downwardly tapered, as viewed when the tool 1 is in its upright position, and the wedge members 8 are vertically movable in the space S. Moreover, each wedge member 8 is placed in the space S such that it has opposite each other a front side face 8a for contacting a rope R, which front side face 8a faces the upright plate 6, in particular the planar face 6a thereof, and is parallel with the planar face 6a of the upright plate 6 (i.e. vertically), and a back side face 8b, which faces the inclined plate 7 and is parallel with the inclined plate 7, in particular with the inclined face 7a thereof. The back side faces 8b of the wedge members 8 are arranged to be supported against the inclined face 7a of the inclined plate 7.

The rope lifting tool 1 is made suitable for belt-shaped ropes, i.e. for ropes having width substantially larger than thickness, by configuring each said gap G substantially larger in width direction of the rope lifting tool 1 than in thickness direction of the rope lifting tool 1. Each said gap G is also configured to be at least substantially rectangular whereby it can receive a rope having at least substantially rectangular cross-section.

The narrowing of the gap G is provided for in the presented embodiments more particularly such that the wedge members 8 are movable in the wedge shaped space S in first direction (downwards) such that the rope gap G is narrowed and in second direction (upwards) such that the rope gap G is widened. Thus, the clamping effect can be obtained by moving the wedge members 8 in the first direction and the released by moving the wedge members 8 in the second direction.

In the presented embodiments, the wedge shaped space S is downwardly tapered as viewed when the rope lifting tool 1 is in its upright position. The wedge members 8 are movable in the wedge shaped space S between a lower position L and an upper position U, whereby the gap G is narrower when the wedge members 8 are in the lower position than in the upper position. For facilitating installation inside the gap G and/or for facilitating removal of the ropes from the gap G, the rope lifting tool 1 comprises a holding means 9 for holding the wedge members 8 in said upper position. Thereby, the holding means 9 are configured for holding the wedge member 8 in a position where the gap G is wide, i.e. in the upper position. Thus, the rope R can be placed in the gap G without simultaneously handling manually the wedge members 8. The holding means 9 are more specifically such that the rope lifting tool 1 comprises separate holding means 9 for each of the wedge members 8, the wedge members 8 then being separately holdable in the upper position. The holding means 9 are preferably designed to comprise a releasable plunger having a head 9a movable into and out from a recess formed in the wedge member 8. In this case, it is preferable that the plunger is spring-loaded to urge the head 9a to move into said recess, particularly when wedge member 8 is in upper position such that the recess and the head 9acoincide.

For enabling easy lifting of the rope lifting tool 1 the lifting tool 1, in particular the upright plate 6 thereof, comprises a suspending means 12 for suspending the rope lifting tool 1, such as an aperture for receiving a lifting hook 15.

For facilitating manual actuation of the wedge members 8, each wedge member 8 has a handle 11 for manual movement thereof inside the space S. The handle 11 is positioned on top of each wedge member 8 whereby it is easily accessible at the wider side of the wedge shaped space S. In the embodiment illustrated, the handle 11 comprises an eye through which a finger can be inserted. The handle is in this case implemented such that the handle is an eye bolt fixed on the wedge member 8.

The rope lifting tool further comprises a limit means 16a,16b for limiting the range of vertical movement of the wedge member 8, at least in the downwardly direction. The wedge members 8 are thus kept from falling down in the hoistway. In the embodiment presented, the limit means 16a,16b comprises a guide bolt 16a fixed on each wedge member 8 and an elongated aperture 16b provided on the inclined plate 7 through which the guide bolt extends. The upper and lower edges of the aperture 16b form a stop face for the bolt 16a and thereby block further movement of the corresponding wedge member 8.

The rope lifting tool 1 further comprises one or more limit members 17 between wedge members 8 next to each other for limiting the range of movement of them in width direction w of the rope lifting tool 1. The limit members also delimit the gaps G in width direction w of the rope lifting tool 1 thereby limiting the range of movement of the rope R in the gap G in width direction w of the rope lifting tool 1.

The rope lifting tool 1 further comprises a fixing means 10,13 for fixing the plates 6,7 immovably relative to each other. Said means are preferably releasable for enabling detachment of the plates 6,7 from each other. Said means 10,13 comprise an intermediate member 10 placed between the plates 6,7 to position these relative to each other. Said means 10,13 further comprise a tightening means 13 for tightening the plates 6,7 against the intermediate member 10 placed between them.

Referring to the essence of the rope lifting tool 1 in general, the lifting tool 1 has a height as measured in vertical direction v, width as measured in width direction w and thickness as measured in thickness direction t, each at a 90 degrees angle relative to each other. The upright plate 6 extends in vertical direction v when the tool 1 is in its upright position, and said rope gap G is narrowable in thickness direction t of the rope lifting tool 1. The guides 2,4 are preferably configured such that the first guide 2 and the second guide 4 are on opposite sides of the upright plate 6 in width direction w of the rope lifting tool 1, as illustrated. Thus, the rope lifting tool 1 can be guided such that the rope supporting members i.e. the upright plate 6, and an inclined plate 7, and the wedge members have a guide rail on each of its two sides, whereby the lifting is well guided and controlled.

Figure 7:
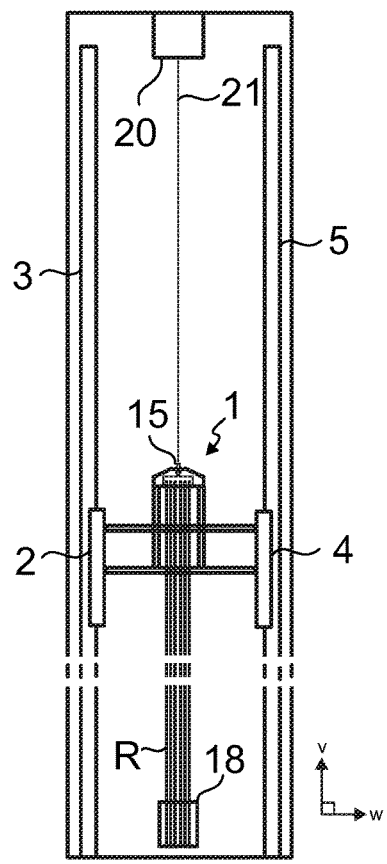
FIG. 7 illustrates a rope lifting arrangement for installing ropes implementing the rope lifting tool.

FIG. 7 illustrates a rope lifting arrangement utilizing the rope lifting tool 1 above described. The rope lifting arrangement is an arrangement for installing said ropes R and comprises the rope lifting tool 1 as described, and a plurality of ropes R each having an end placed in a rope gap G of said rope lifting tool 1 and clamped immovably therein by wedging of the wedging member 8. The rope lifting tool 1 is in its upright position whereby the upright plate 6 is aligned to extend along a vertical plane. The arrangement is preferably in accordance with an embodiment illustrated in FIGS. 3a-3c or 4a-4c.

The rope lifting tool 1 is installed in a hoistway H of an elevator. It is mounted to take lateral support from vertical guide rails 3,5 by its guides 2,4. In particular, the first guide 2 is arranged to lean against a first guide rail 3 mounted immovably in the hoistway H, and the second guide 4 to lean against a second guide rail 5 mounted immovably in the hoistway H. The rope lifting arrangement further comprises a hoist 20 arranged to lift the lifting tool 1. The hoist 20 is mounted stationary and is arranged to move a rope, chain or equivalent flexible member 21 connected with the rope lifting tool 1. The flexible member 21 is connected with a suspending means 12 of the rope lifting tool 1, such as an aperture 15, with a lifting hook 15. The arrangement further comprises one or more rope reels 18 wherefrom the ropes R are unreeled while the rope ends are immovably wedged and the rope lifting tool 1 lifts them. The suspending means 12 are higher than the wedge members 8, when the rope lifting tool is viewed in its upright position, whereby the lifting force for lifting of the tool 1 are above the level on which the ropes R are clamped. Thus, the tendency of the tool 1 for tilting is reduced.

The rope lifting tool 1 is particularly advantageous when the ropes R are sensitive for bending and/or for local mechanical compression such as compression caused when fixing by screws would be done. Great local mechanical forces are likely to damage the rope when the rope has non-metallic coating and/or fragile load bearing members. The presented rope lifting tool 1 provides a reliable clamping with even force distribution without necessity to bend the ropes R. Accordingly, it solves problems of ropes R sensitive to bending. Owing to that the uneven sides of the ropes are contacted each by a contact face forming a counterpart therefor provides a gentle grip without permanent deformations.

The ropes R are preferably such that each rope R comprises one or more load bearing members embedded in polymer coating and extending parallel to the longitudinal direction of the rope unbroken throughout the length of the rope. Preferably, said one or more load bearing members is/are made of composite material comprising reinforcing fibers embedded in polymer matrix, said reinforcing fibers preferably being carbon fibers which have excellent properties for being used in elevator ropes. The ropes are preferably more specifically as disclosed in international patent application WO2009090299A1.

As mentioned, in the preferred embodiment, the gap G is delimited by two opposing faces 6a,8a;6a'8a. These faces 6a,8a;6a'8a are planar, albeit they are contoured to be uneven. Thereby a planar side S1,S2 of the rope R can be contacted by each of them gently. It follows, that these faces 6a,8a;6a'8a are furthermore straight in vertical direction v as viewed when the rope lifting tool 1 is in upright position, whereby rope R clamped by them will not be bent. As mentioned in context of embodiment of FIGS. 3a-3c the contact face resting against the side of the rope that does not have an uneven pattern may be smooth, but this is not necessary as alternatively it may be roughened, such as provided with knurling. The guides 2,4 can be sliding members or rolling members. The sliding members are elongated in the direction of the guide rail, for example, as illustrated. Thereby, they can have a long support face or several support points distributed along the length of the guide rail 3,5. Thereby, they can effectively resist tilting caused by weight of the ropes R. The guides could alternatively be of some other construction, for example designed to have one or several rollers instead of sliding members.

In the preferred embodiments, the uneven surface pattern is a polyvee pattern. However, this is not necessary as it could alternatively be some other kind of pattern, such as a tooth pattern, for instance. In the preferred embodiments, the uneven surface pattern is similar on both wide sides of the rope. However, it is also possible that the rope has different uneven surface patterns on its opposite wide sides. In this case, also the counterpart pattern formed by the vertical contact faces would be different from each other.

In the preferred embodiment illustrated the back side faces 8b of the wedge members 8 are arranged to be supported directly against the inclined face 7a of the inclined plate 7, but alternatively the inclined face 7a could serve as a support face for liner(s) attached thereto, in which case the liner(s) would have inclined face(s) parallel with face 7a against which the wedge members 8 would be supported.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A rope lifting tool for a belt-shaped rope provided with an uneven surface pattern on one or both of opposing wide sides, thereof, the rope lifting tool comprising:
   a first guide for guiding the rope lifting tool along a first guide rail in a vertical direction;
   a second guide for guiding the rope lifting tool along a second guide rail in the vertical direction;
   an upright plate;
   an inclined plate being separate from and spaced from the upright plate, wherein an entirety of the inclined plate is provided at an acute angle relative to the upright plate, the upright plate and the inclined plate having a wedge shaped space therebetween;
   a plurality of wedge members placed adjacent each other inside the wedge-shaped space; and
   a plurality of holders, each holder including a releasable plunger having a head movable into and out from an aperture of a respective wedge member, wherein each holder is configured to extend only through an aperture of the respective inclined plate and into the aperture of the respective wedge member to vertically fix the respective wedge member within the wedge-shaped space,
   wherein only the upright plate includes an aperture for receiving a lifting hook for lifting the rope lifting tool in the vertical direction,
   wherein a rope gap for receiving an end of the belt-shaped rope is formed between each wedge member and the upright plate, which rope gap is narrowable by wedging of each wedge member in the wedge shaped space,
   wherein each said rope gap is delimited by a vertical face of the respective wedge member and a vertical face of the upright plate or a vertical face of a liner attached thereon, and one or both of the vertical faces delimiting the rope gap is provided with an uneven surface pattern for forming a counterpart for the uneven surface pattern of said belt-shaped rope, and
   wherein the vertical face of each wedge member is substantially parallel with the vertical face of the upright plate.

2. The rope lifting tool according to claim 1, wherein said vertical face of each wedge member is provided with an uneven surface pattern forming a counterpart for the uneven surface pattern of said belt-shaped rope.

3. The rope lifting tool according to claim 2, wherein said vertical face of said liner is provided with an uneven surface pattern forming a counterpart for the uneven surface pattern of said belt-shaped rope.

4. The rope lifting tool according to claim 1, wherein said vertical face of said liner is provided with an uneven surface pattern forming a counterpart for the uneven surface pattern of said belt-shaped rope.

5. The rope lifting tool according to claim 1, wherein the uneven surface pattern of said belt-shaped rope is a polyvee pattern.

6. The rope lifting tool according to claim 1, wherein the rope lifting tool comprises a plurality of liner plates attached on the upright plate opposite the wedge members.

7. The rope lifting tool according to claim 1, wherein said one or both of the vertical faces delimiting the rope gap are planar.

8. The rope lifting tool according to claim 1, wherein the wedge shaped space and the wedge members are downwardly tapered and each wedge member is placed in the wedge-shaped space such that each wedge member has, opposite each other, a front side face for contacting a rope, which front side face faces the upright plate and is parallel with the upright plate, and a back side face, which faces the inclined plate and is parallel with the inclined plate.

9. The rope lifting tool according to claim 1, wherein the wedge members are movable separately from each other in the wedge shaped space.

10. The rope lifting tool according to claim 1, wherein the wedge members are movable in the wedge shaped space in first direction (downwards) such that the rope gap is narrowed and in second direction (upwards) such that the rope gap is widened.

11. The rope lifting tool according to claim 1, wherein the rope lifting tool comprises a limit member between wedge members next to each other for limiting the range of movement of wedge members next to each other in width direction of the rope lifting tool.

12. The rope lifting tool according to claim 1, further comprising a plurality of guide bolts,
  wherein each guide bolt extends only through a respective elongated aperture of the inclined plate into a respective wedge member, each elongated aperture has a substantially oblong shape, and each guide bolt is movable along a length of the respective elongated aperture to alter a vertical position of the respective wedge member, and
  wherein the guide bolts are spaced from the plurality of holders.

13. The rope lifting tool according to claim 1, wherein the wedge-shaped space is defined only by the inclined plate and the upright plate.

14. A rope lifting arrangement comprising:
  the rope lifting tool as defined in claim 1; and
  a plurality of ropes provided with an uneven surface pattern on one or both of opposing wide sides thereof, each rope having an end placed in a rope gap of said rope lifting tool and clamped immovably therein by wedging of the wedge member.

15. The rope lifting arrangement according to claim 14, wherein each rope is provided with the uneven surface pattern on the respective wide side placed to rest against a vertical face of a liner attached on the vertical face of the upright plate, which vertical face of the liner is provided with an uneven surface pattern forming a counterpart for the uneven surface pattern of the wide side of each rope.

16. The rope lifting arrangement according to claim 14, wherein each rope is provided with the uneven surface pattern on the respective wide side placed to rest against the vertical face of the respective wedge member, which vertical face of said respective wedge member is provided with an uneven surface pattern forming a counterpart for the uneven surface pattern of said wide side.

17. The rope lifting arrangement according to claim 14, wherein the arrangement further comprises a hoist arranged to lift the rope lifting tool.

18. The rope lifting arrangement according to claim 14, wherein the rope lifting tool is installed in a hoistway of an elevator, the first guide being arranged to lean against a first guide rail mounted in the hoistway, and the second guide being arranged to lean against a second guide rail mounted in the hoistway.

19. The rope lifting arrangement according to claim 14, wherein the arrangement is an arrangement for installing said ropes in an elevator.

20. The rope lifting arrangement according to claim 14, wherein the arrangement further comprises one or more rope reels storing said ropes wherefrom the ropes are unreeled while the rope ends are immovably wedged and lifted by the rope lifting tool.

* * * * *